Nov. 20, 1962 G. DURST 3,064,524
PNEUMATIC SUCTION PLATE
Filed May 25, 1960
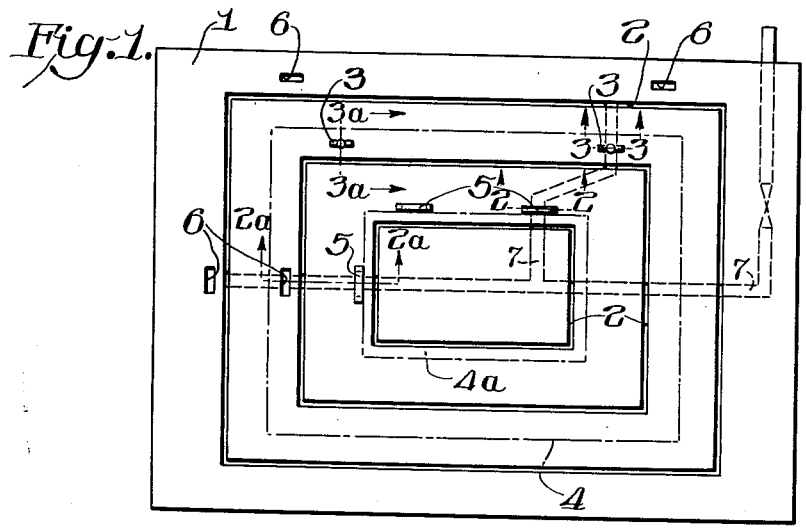
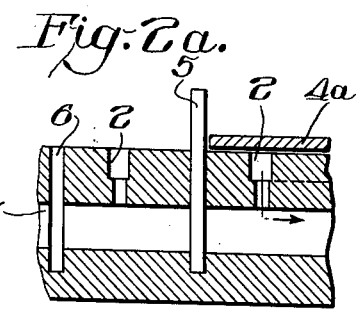
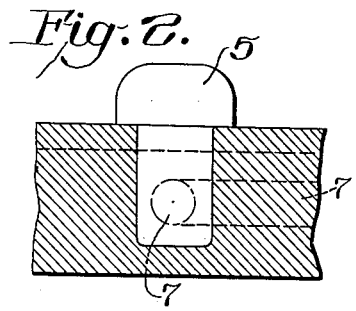
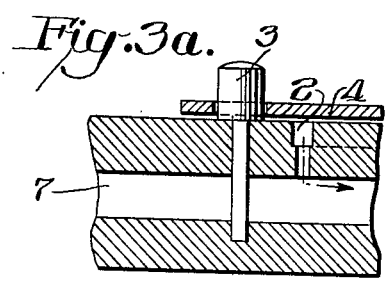
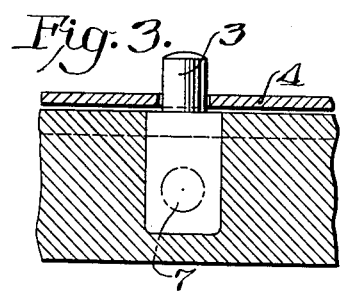
INVENTOR
Gilberto Durst
BY Connolly and Hutz
ATTORNEYS

# United States Patent Office 3,064,524
Patented Nov. 20, 1962

3,064,524
PNEUMATIC SUCTION PLATE
Gilberto Durst, Bressanone, Italy, assignor to Durst S.pA., Fabbrica Macchine ed Apparecchi Fototecnici, Bolzano, Italy
Filed May 25, 1960, Ser. No. 31,614
Claims priority, application Italy Aug. 5, 1959
6 Claims. (Cl. 88—24)

This application relates to a pneumatic suction plate for photographic and graphic purposes, and more particularly relates to such a plate having variable areas to which suction may be applied.

Suction plates have been used in reproduction and graphic work for securely holding light-sensitive films as well as photoengraving sheets. Valving arrangements have been provided for changing the size of the area to which suction is applied on these plates. When, for example, one is to operate upon a film of the twenty-four by thirty centimeter size, the proper valve for controlling the suction openings (holes, slits and the like) is turned on to apply suction within an area of that size located upon the plate, and the suction openings for the remaining larger areas of the plate are closed off. Furthermore, projecting surfaces must be positioned around the perimeter of the area to which suction is applied to accurately position or center the sheet. Two operations have, therefore, been required. One is the outlining of the perimeter of the suction area with the projecting surfaces, and the other is the opening and closing of the necessary valves to subject only the selected area to the suction force. These two operations both require time as well as coordination to avoid the possibility that the wrong valving arrangement might be operated for the selected area.

An object of this invention is to provide a simple and conveniently operated suction plate for photographic and reproduction purposes in which the outlining of the suction area and application of suction are automatically coordinated.

In accordance with this invention, a suction passageway extends within the suction plate from the center outwardly. Slots extend from the surface of the plate through this passageway in positions corresponding to various predetermined perimeter sizes. Rods are provided which are insertable into these slots to simultaneously seal the remote areas of the suction passageway and to act as positioning projections for centering sheets upon the plate within the suction area.

Novel features and advantages of the present invention will become apparent to one skilled in the art from a reading of the following description in conjunction with the accompanying drawings wherein similar reference characters refer to similar parts and in which:

FIG. 1 is a plan view of one embodiment of this invention; and

FIGS. 2, 2A, 3 and 3A are cross-sectional views taken through FIG. 1 respectively along the lines 2—2, 2A—2A, 3—3 and 3A—3A.

In FIG. 1 is shown a suction plate 1 having three grooves 2 of varying size cut in the surface of the plate in closed continuous configurations such as rectangles of various sizes. The sizes of these grooves 2 are slightly smaller than the size of sheets 4 of film or photoengraving type which are positioned selectively over one or more of grooves 2 as shown in phantom outline in FIG. 1.

Two types of centering rods 3 and 5 are illustrated for positioning or centering sheets over the selected suction area. Rods 3, for example, have knob-shaped ends and they are shown inserted in the innermost set of slots 6. A perforated film 4 is guided over rods 3 with knob-shaped tops as shown in FIGS. 3 and 3A, and rods 5 with flat tops are used for positioning unperforated sheets 4a as shown in the central portion of FIGS. 1, 2 and 2A.

A suction duct 7 extends from the central area of suction plate 1 outwardly successively from innermost to outermost suction grooves 2. Duct 7 is shown with two legs, and each of these two legs passes successively under slots 2 in one direction from innermost to outermost set of grooves. When either of rods 3 or 5 are positioned within a set of slots around a format of a given size, they simultaneously close off the grooves positioned beyond it or outside of it from suction through passageway 7. This simultaneously provides the proper centering for a sheet to be worked on and cuts off the application of suction to the area lying outside this sheet. Passageway 7 accordingly need not extend past the outermost groove 2 since there are no other grooves beyond the last set of positioning slots 6 to be cut off from the application of suction when they are used for positioning the largest size sheet that the plate will hold.

What is claimed is:

1. A suction plate comprising a flat surface for receiving and holding sheets flat upon it, a suction passageway extending outwardly within said plate under said surface from a central area of said surface, said plate including a series of grooves within said surface of varying size for applying suction to sheets disposed upon said surface, sets of slots intersecting said suction passageway and extending through said surface into said plate at positions slightly outside of each of said grooves, and rods long enough to project above said surface which are engageable with a set of said slots disposed outside one of said grooves for simultaneously cutting off suction from grooves outside of said slots within which said rods are inserted and providing guide projections above said surface for positioning sheets over the suction area upon said surface provided by grooves which are centrally disposed with respect to said slots into which said rods are inserted.

2. A suction plate as set forth in claim 1 wherein said rods have flat-shaped tops for providing a guiding surface for the outermost edges of said sheets.

3. A suction plate as set forth in claim 1 wherein said grooves are formed in rectangular shapes.

4. A suction plate comprising a flat surface for receiving and holding sheets flat upon it, a suction passageway extending outwardly within said plate under said surface from a central area of said surface, said plate including a series of grooves within said surface of varying size for applying suction to sheets disposed upon said surface, sets of slots intersecting said suction passageway and extending through said surface into said plate at positions slightly outside of each of said grooves, rods long enough to project above said surface which are engageable with a set of said slots disposed outside one of said grooves for simultaneously cutting off suction from grooves outside of said slots within which said rods are inserted and providing guide projections above said surface for positioning sheets over the suction area upon said surface provided by grooves which are centrally disposed with respect to said slots into which said rods are inserted, said suction duct extending only to the outermot groove, and a set of slots being disposed outside of this outermost groove for centering the largest sheet which said plate receives.

5. A suction plate comprising a flat surface for receiving and holding sheets flat upon it, a suction passageway extending outwardly within said plate under said surface from a central area of said surface, said plate including a series of grooves within said surface of varying size for applying suction to sheets disposed upon said surface, sets of slots intersecting said suction passageway and extending through said surface into said plate at positions slightly outside of each of said grooves, rods long enough to project above said surface which are engageable with a set of said slots disposed outside one of said grooves for simultaneously cutting off suction from grooves outside of said slots within which said rods are inserted and providing guide projections above said surface for positioning sheets over the suction area upon said surface provided by grooves which are centrally disposed with respect to said slots into which said rods are inserted, the tops of said rods being shaped as knobs for engaging perforation within the edge of a film sheet.

6. A suction plate comprising a flat surface for receiving and holding sheets flat upon it, a suction passageway extending outwardly within said plate under said surface from a central area of said surface, said plate including a series of grooves within said surface of varying size for applying suction to sheets disposed upon said surface, sets of slots intersecting said suction passageway and extending through aid surface into said plate at positions slightly outside of each of said grooves, rods long enough to project above said surface which are engageable with a set of said slots disposed outside one of said grooves for simultaneously cutting off suction from grooves outside of said slots within which said rods are inserted and providing guide projections above said surface for positioning sheets over the suction area upon said surface provided by grooves which are centrally disposed with respect to said slots into which said rods are inserted, said grooves being formed in a rectangular shape, said suction duct having two legs extending under adjacent sides of said rectangular grooves, said slot being provided only outside said two adjacent sides of said grooves, and said other two sides being left open for insertion and withdrawal of said sheets.

References Cited in the file of this patent
UNITED STATES PATENTS

| | | |
|---|---|---|
| 2,317,348 | Wekeman | Apr. 27, 1943 |
| 2,895,706 | Blatherwick | July 21, 1959 |